(12) United States Patent
Kushida et al.

(10) Patent No.: US 7,239,457 B2
(45) Date of Patent: Jul. 3, 2007

(54) WIDE ANGLE LENS SYSTEM AND CAMERA

(75) Inventors: Taro Kushida, Nagano (JP); Nobumasa Kambayashi, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/360,887

(22) Filed: Feb. 23, 2006

(65) Prior Publication Data

US 2007/0024992 A1 Feb. 1, 2007

(30) Foreign Application Priority Data

Jul. 29, 2005 (JP) .............................. 2005-219989

(51) Int. Cl.
*G02B 9/34* (2006.01)
*G02B 13/04* (2006.01)

(52) U.S. Cl. ...................... 359/783; 359/781; 359/771; 359/753

(58) Field of Classification Search ........ 359/781–783, 359/749, 753, 771
See application file for complete search history.

(56) References Cited

U.S. PATENT DOCUMENTS 6,825,993 B2 * 11/2004 Noda .......................... 359/749

6,865,026 B2 3/2005 Nozawa et al.
6,985,305 B2 1/2006 Takeuchi

FOREIGN PATENT DOCUMENTS

| JP | 2000-292692 | 10/2000 |
|---|---|---|
| JP | 2003-98430 | 4/2003 |
| JP | 3437004 | 6/2003 |
| JP | 2003-302575 | 10/2003 |
| JP | 2004-53993 | 2/2004 |
| JP | 2004-061910 | 2/2004 |
| JP | 2005-107036 | 4/2005 |

* cited by examiner

*Primary Examiner*—Ricky Mack
*Assistant Examiner*—Jack Dinh
(74) *Attorney, Agent, or Firm*—Thomas J. Strouse

(57) ABSTRACT

There is provided a wide angle lens system configured to obtain excellent image forming performance even in a half field angle region of 40 degrees to 50 degrees. A wide angle lens system is constituted of a first lens having a negative refractive power, a light path bending member having no refractive power, a second lens having a positive refractive power, an aperture which adjusts a light amount, a first cemented lens formed by cementing a third lens having a positive refractive power and a fourth lens having a negative refractive power, a fifth lens having a positive refractive power, and an optically equivalent member which functions as a faceplate of an optical low-pass filter and a solid state imaging element.

4 Claims, 4 Drawing Sheets

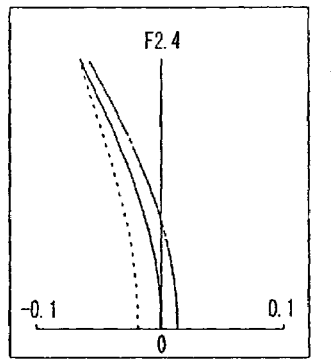 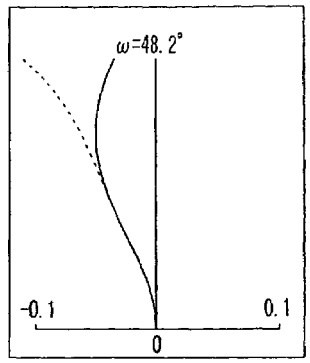 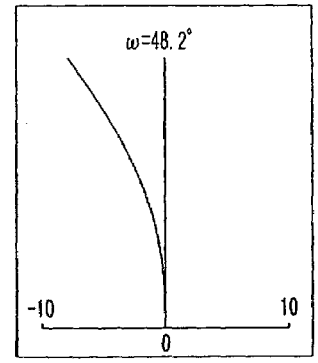
Fig. 5A　　　　Fig. 5B　　　　Fig. 5C
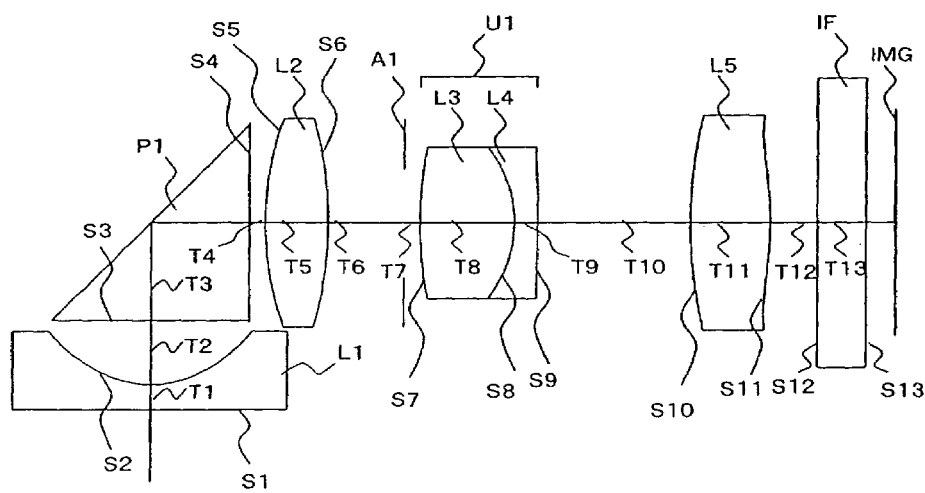
Fig. 6

WIDE ANGLE LENS SYSTEM AND CAMERA

BACKGROUND OF THE INVENTION

The present invention relates to a wide angle lens system and a camera provided with the wide angle lens system.

In recent years, there has been increased demand for a reduction in size or thickness of a digital camera. Further, a demand for a reduction in size or thickness and cost saving is also high with respect to an imaging optical system mounted in a digital camera. In order to meet these demands, an imaging optical system in which optical elements such as a prism used to bend a light path halfway are arranged has come into practical use while the number of the optical elements is reduced.

Further, in recent years, there has also been an increased demand for an imaging optical system having a wide field angle or an imaging optical system which is bright even if its F number is small in order to increase added value of a product while achieving excellent correction of aberration to cope with an increase in the number of pixels of a solid state imaging element such as a CCD.

Japanese Patent Laid-Open Publication No. 2004-53993, Japanese Patent Laid-Open Publication No. 2003-302575, Japanese Patent Laid-Open Publication No. 2003-98430 and Japanese Patent Laid-Open Publication No. 2000-292692 each disclose an imaging optical system in which light path bending members and others such as a negative lens having a negative refractive power, a prism or the like are arranged in order from an object side.

Japanese Patent Laid-Open Publication No. 2004-53993 and Japanese Patent Laid-Open Publication No. 2003-302575 disclose a zoom lens system including, in order from an object side, a first lens group having an overall negative refractive power, a second lens group having an overall positive refractive power, and a third lens group having an overall positive refractive power. Japanese Patent Laid-Open Publication No. 2004-53993, Japanese Patent Laid-Open Publication No. 2003-302575 disclose the zoom lens system which has the reduced number of optical elements and corrects an aberration while decreasing a size thereof as a structure in which the first lens group includes a negative lens and a light path bending member in order from the object side.

However, in the zoom lens system disclosed in Japanese Patent Laid-Open Publication No. 2004-53993 or Japanese Patent Laid-Open Publication No. 2003-302575, a distance between the first lens group and an aperture is long on a wide angle side in order to configure the zoom lens system. Therefore, in order to realize a so-called super wide angle, the light path bending member or the negative lens arranged on the object side apart from the light path bending member must be considerably increased in size. Furthermore, a half field angle of the zoom lens system disclosed in Japanese Patent Laid-Open Publication No. 2004-53993 or Japanese Patent Laid-Open Publication No. 2003-302575, is approximately 30 degrees to 32 degrees, and configuring a super wide angle lens system having a half field angle of 40 degrees to 50 degrees is not considered.

Therefore, Japanese Patent Laid-Open Publication No. 2004-53993 or Japanese Patent Laid-Open Publication No. 2003-302575, do not disclose effective means for correcting various aberrations such as a coma aberration outside an optical axis which becomes a problem when configuring a super wide angle lens system having a half field angle of 40 degrees to 50 degrees.

Moreover, Japanese Patent Laid-Open Publication No. 2003-98430 discloses a fixed focus lens constituted of a negative lens, a light path bending member, an aperture, a positive lens system and a cemented lens which is obtained by cementing the positive lens and the negative lens in order from an object side.

However, the fixed focus lens system disclosed in Japanese Patent Laid-Open Publication No. 2003-98430 has a configuration in which the aperture is arranged immediately after an exit surface of the light path bending member. Therefore, correction of an aberration of a light beam which enters from a wide field angle is difficult when the fixed focus lens system disclosed in Japanese Patent Laid-Open Publication No. 2003-98430 is used to constitute a super wide angle lens system, and hence excellent image forming performance is hardly obtained.

Additionally, Japanese Patent Laid-Open Publication No. 2000-292692 discloses a technique which forms at least one of an incidence surface and a reflecting surface into a curved surface as a light path bending member, thereby reducing a size.

However, in the case of the light path bending member disclosed in Japanese Patent Laid-Open Publication No. 2000-292692, manufacture of an optical element unit is difficult compared with a regular prism whose light ray transmitting surfaces or reflecting surfaces are all flat surfaces. Further, since optical axis matching when incorporating such an optical element in an optical system is also very difficult, stably obtaining high performance is difficult in manufacture.

Furthermore, a half field angle of the lens system disclosed in Japanese Patent Laid-Open Publication No. 2003-98430 or Japanese Patent Laid-Open Publication No. 2000-292692 is approximately 30 degrees to 36 degrees, and these references do not disclose effective means for correcting various aberrations such as a coma aberration outside an optical axis which becomes a problem when constituting a super wide angle lens system whose half field angle is 40 degrees to 50 degrees.

SUMMARY OF THE INVENTION

It is an object of the present invention to provide a wide angle lens system configured to obtain excellent image forming performance even in a half field angle region of 40 degrees to 50 degrees.

According to one aspect of the present invention, there is provided a wide angle lens system comprising in order from an object side: a first lens which has a negative refractive power and at least one surface as an aspheric surface; a bending member which bends a light path; a second lens having a positive refractive power; an aperture which adjusts a light amount; a first cemented lens obtained by cementing a third lens having a positive refractive power and a fourth lens having a negative refractive power; and a fifth lens having a positive refractive power, wherein one surface of at least one of the lenses positioned on an image forming surface side apart from the aperture is aspherical.

According to another aspect of the present invention, there is provided a wide angle lens system comprising in order from an object side: a first lens which has a negative refractive force and at least one surface as an aspheric surface; a bending member which bends a light path; a second lens having a positive refractive force; an aperture which adjusts a light amount; a first cemented lens obtained by cementing a third lens having a positive refractive power and a fourth lens having a negative refractive power; and a second cemented lens obtained by cementing a fifth lens having a positive refractive power and a sixth lens having a negative refractive lens, wherein one surface of at least one of the lenses positioned on an image forming surface side apart from the aperture is aspherical.

Further, in a preferred aspect, $0.9<|f1/f|<1.6$ is satisfied, wherein f1 is a focal length of the first lens, and f is a combined focal length of the entire lens system of the wide angle lens system.

In another preferred aspect, the bending member is a prism using a glass material satisfying $1.6<nd<1.85$ and $vd<40$, wherein nd is a refractive index of the bending member with respect to a d-line, and vd is an Abbe number of the bending member with respect to the d-line.

In still another preferred aspect, $1.7<|d/f|<2.2$ is satisfied, wherein $d$ ($=d1+d2+d3$) of a sum total of d1 which is an interval between a reflecting surface of the bending member and the second lens on an optical axis, d2 ($=T5/nd3$) which is a value obtained by dividing a wall thickness T5 of the second lens on the optical axis by a refractive index nd3 and d3 which is an interval between the second lens and the aperture on the optical axis, and f is a combined focal length of the entire lens system of the wide angle lens system.

In yet another preferred aspect, one of the aspheric surfaces positioned on the image forming surface side apart from the aperture is arranged in a last lens closest to the image forming surface side and has a shape with which a positive refractive power is gradually weakened or a negative refractive power is intensified toward the periphery from the optical axis.

In a further preferred aspect, the last lens which constitutes the wide angle lens system and is arranged to be closest to the image forming surface side is formed of a resin lens.

According to the present invention, it is possible to provide a wide angle lens system configured to obtain excellent image forming performance even in a half field angle region of 40 degrees to 50 degrees.

BRIEF DESCRIPTION OF THE DRAWINGS

FIG. 5 is a view showing various aberrations of the wide angle lens system according to the second embodiment;

FIG. 6 is a view showing a cross section of a wide angle lens system according to a third embodiment along an optical axis;

DETAILED DESCRIPTION OF THE PREFERRED EMBODIMENTS

The best mode for carrying out the present invention (which will be referred to as an embodiment hereinafter) will now be described with reference to the accompanying drawings.

Figure 1:
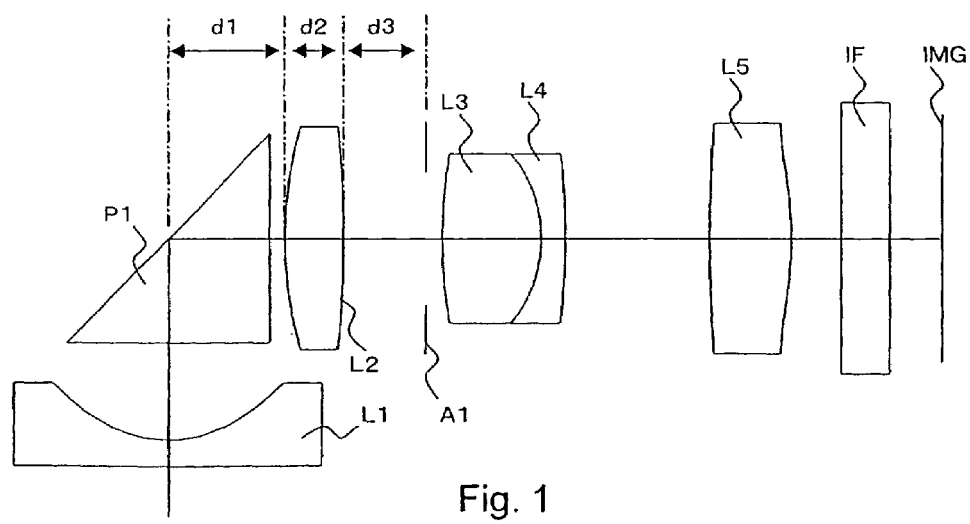
FIG. 1 is a view showing a cross section of a wide angle lens system according to this embodiment along an optical axis.

FIG. 1 is a cross-sectional view of a wide angle lens system according to this embodiment along an optical axis. As shown in FIG. 1, in the wide angle lens system according to this embodiment, respective optical elements, i.e., a first lens L1, a light path bending member P1, a second lens L2, an aperture A1, a first cemented lens U1, a fifth lens L5 and an optically equivalent member IF are arranged in order from an object side (a subject side). The first lens L1 is a lens having a negative refractive power. The light path bending member P1 is an optically equivalent member which does not have a refractive power which bends a light path on an optical axis at substantially 90 degrees. The second lens L2 is a lens having a positive refractive power. The aperture A1 is a mechanism which adjusts a light amount. The first cemented lens U1 is configured by cementing a third lens L3 having a positive refractive power and a fourth lens L4 having a negative refractive power. The fifth lens L5 is a lens having a positive refractive power. The optically equivalent member IF functions as a faceplate of an optical low-pass filter and a solid state imaging element. Further, in FIG. 1, "IMG" denotes an image forming surface.

Such a wide angle lens system is configured in such a manner that a refractive power of all the optical elements arranged on the object side from the aperture A1 is negative and a refractive power of all the optical elements arranged on the image forming surface side from the aperture A1 is positive. That is, the wide angle lens system according to this embodiment is formed of a so-called retrofocus lens system. Providing such a configuration enables the wide angle lens system according to this embodiment to realize a reduction in diameter and an increase in angle.

Furthermore, it is desirable for the wide angle lens system to satisfy the following respective conditions in order to obtain excellent image forming performance while realizing a reduction in diameter or an increase in field angle.

First, in order to realize a reduction in thickness in a direction facing an object, it is desirable to arrange the light path bending member P1 to be close to the object side as much as possible. However, in order to achieve the best possible correction of various aberrations such as a chromatic aberration generated due to an incident light ray which mainly enters at a high angle with an increase in angle, the respective optical elements arranged on the object side from the aperture A1 are arranged in the order of the first lens L1, the light path bending member P1 and the second lens L2 from the object side.

Moreover, any surface constituting the first lens L1 is formed into an aspheric surface. As a result, it is possible to achieve excellent correction of a negative distortion generated when an incident light beam from a high angle is transmitted through a lens peripheral portion of the first lens L1.

Additionally, assuming that f1 is a focal length of the first lens L1 and f is a combined focal length of the entire lens system constituting the wide angle lens system, it is desirable for f1/f to satisfy the following Condition (1).

$$0.9<|f1/f|<1.6 \qquad (1)$$

When f1/f satisfies the above-described condition, excellent aberration correction can be realized in the entire lens system constituting the wide angle lens system. It is to be noted that, when f1/f exceeds 1.6 which is an upper limit of Condition (1), the negative refractive power of the first lens L1 is insufficient, and an effective diameter of the first lens L1 and a size of the light path bending member P1 are increased, which results in an obstacle of a reduction in size of the wide angle lens system. Further, when f1/f becomes smaller than 0.9 which is a lower limit of Condition (1), and off-axis aberrations such as astigmatism or a magnification chromatic aberration generated in the first lens L1 are increased, which makes it very difficult to correct various aberrations generated in the optical elements arranged on the image forming surface side apart from the first lens L1.

Furthermore, assuming that nd is a refractive index with respect to a d-line, and vd is an Abbe number with respect to the d-line, it is desirable for the light path bending member P1 to be formed of a triangular prism using a glass material satisfying the following Condition (2) and Condition (3).

$$1.75 < nd < 1.85 \quad (2)$$

$$vd < 40 \quad (3)$$

In the case of a glass material having a refractive index nd smaller than 1.75, which is a lower limit of Condition (2), a light path length becomes too short, which becomes an obstacle to reduction in size or in diameter of the wide angle lens system. Moreover, a glass material having a refractive index nd exceeding 1.85, which is an upper limit of Condition (2), and having an Abbe number vd exceeding 40, which is an upper limit of Condition (3), is generally expensive, which becomes an obstacle to decrease in manufacturing cost.

Additionally, assuming that d (=d1+d2+d3) is a sum total of an interval d1 between a reflecting surface of the optical bending member P1 and the second lens L2 on the optical axis, d2 (=T5/nd3) which is a value obtained by dividing a wall thickness T5 of the second lens on the optical axis by a refractive index nd3 and an interval d3 between the second lens L2 and the aperture A1 on the optical axis, it is desirable to satisfy the following Condition (4):

$$1.7 < |d/f| < 2.2 \quad (4)$$

When Condition (4) is satisfied, a light beam in the periphery is effectively transmitted through a peripheral portion of the first lens L1 and the second lens L2. Therefore, it is possible to achieve excellent correction of various aberrations such as a magnification chromatic aberration generated in the first lens L1, the light path bending member P1 and the second lens L2. As a result, deterioration in image forming performance which is generated when widening an angle of the wide angle lens system can be avoided. It is to be noted that, when the refractive index is smaller than 1.7, which is a lower limit of Condition (4), an effect of the magnification aberration correction cannot be sufficiently obtained. Further, when the refractive index exceeds 2.2 which is an upper limit of Condition (4), the first lens L1 and the light path bending member P1 must be increased in size, which becomes an obstacle to reduction in size of the wide angle lens system.

Furthermore, the respective optical elements arranged on the image forming surface side apart from the aperture A1 are arranged in the order of the first cemented lens U1 and the fifth lens L5 from the object side. As a result, it is possible to achieve excellent correction of on-axis aberrations such as an on-axis chromatic aberration or a spherical aberration.

Moreover, any surface of the lenses arranged on the image forming surface side apart from the aperture A1 is formed into an aspheric surface. As a result, it is possible to achieve excellent correction of various aberrations such as a coma aberration or astigmatism which are generated by the lenses arranged on the object side apart from the aperture A1 and cannot be corrected in these lenses. It is to be noted that forming an exit surface (a surface on the image forming surface side) of the lens arranged at a position closest to the image forming surface side (which will be referred to as a "last lens". The fifth lens L5 is the last lens in FIG. 1) into an aspheric surface can effectively correct an off-axis aberration. Additionally, constituting the last lens of a plastic aspheric lens in place of a glass aspheric lens can reduce cost without deteriorating performance.

As described above, according to this embodiment, appropriately combining the above-mentioned respective conditions can provide, at a low cost, a small and thin wide angle lens system which is a wide angle lens system whose half field angle is 40 degrees to 50 degrees and whose open F number is 2.4 to 2.8.

Further, the wide angle lens system according to this embodiment can perform focusing by moving the last lens toward the object side as a distance from an object to the wide angle lens system (which will be referred to as an object distance hereinafter) is reduced.

Furthermore, the wide angle lens system according to this embodiment can perform focusing by integrally moving a lens which is adjacent to the aperture A1 on the image forming surface side (the second lens L2 is a corresponding lens in FIG. 1) and the aperture A1 toward the object side as the object distance is reduced.

Moreover, the wide angle lens system according to this embodiment can be used as a fixed focus lens system (a pan-focus lens system) by fixing a focal position to a preset object distance since a focal length is short. As a result, the wide angle lens system can perform focusing from approximately ½ of a preset object distance to infinity. Additionally, when the wide angle lens system is used as a fixed focus lens system, the lens system does not have to be driven in order to perform focusing, and driving members such as a motor required to drive the lens system can be reduced, thus realizing a decrease in cost.

First to third embodiments will now be described as concrete embodiments of the wide angle lens system according to this embodiment. It is to be noted that the wide angle lens system according to this embodiment can be mounted in various kinds of cameras such as a digital camera, a monitoring camera, an in-vehicle camera and others.

First Embodiment

Figure 2:
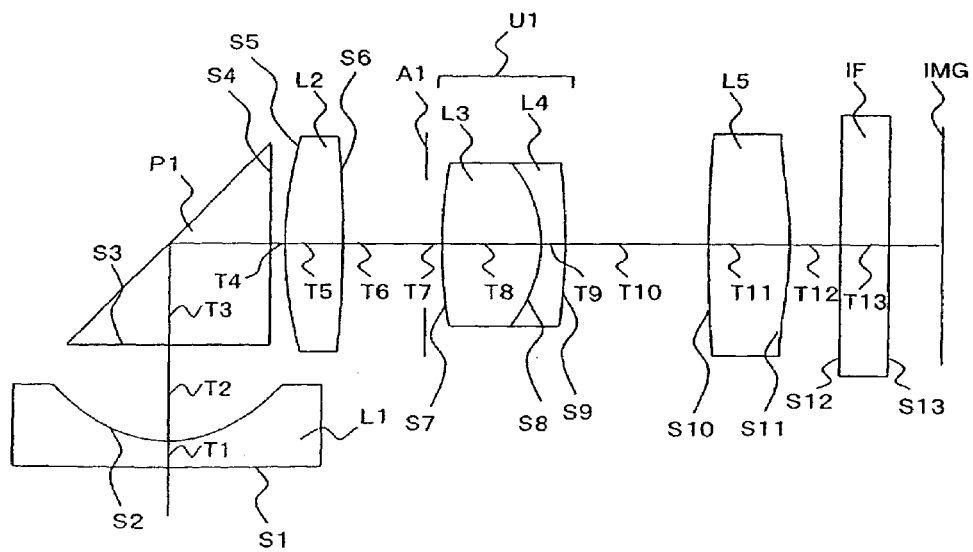
FIG. 2 is a view showing a cross section of a wide angle lens system according to a first embodiment along an optical axis.

A first embodiment will now be described. FIG. 2 is a cross-sectional view of a wide angle lens system according to the first embodiment along an optical axis. The wide angle lens system depicted in FIG. 2 is the same as the above-described wide angle lens system shown in FIG. 1, and hence the explanation of the lens configuration will be omitted. Table 1 shows respective numeric values in the first embodiment. In Table 1, f is a combined focal length of an entire lens system constituting the wide angle lens system, Fno is an F number, and ω is a half field angle. Further, in FIG. 2 and Table 1, surface numbers Si (i=1, 2, 3 ...) denote an incidence surface and exit surface of light on an optical axis of each optical element constituting the wide angle lens system in order from an object side. Furthermore, in FIG. 2, intervals Ti (i=1, 2, 3 ...) designate on-axis intervals (mm) in order from the object side. Moreover, here, a reflecting surface position of a triangular prism is arranged in such a manner that a bending point on an optical axis is placed at an intermediate point which divides an interval between S3 and S4 into two equal intervals.

TABLE 1 f = 3.88 Fno = 2.4 ω = 44.7°

| | SURFACE NUMBER | CURVATURE RADIUS R (mm) | INTERVAL (mm) | REFRACTIVE INDEX nd | ABBE NUMBER vd |
|---|---|---|---|---|---|
| L1 | S1 | 300.000 | 0.80 | 1.7680 | 49.2 |
| | S2 | 3.777 | | | |
| | | | 2.90 | | |
| P1 | S3 | ∞ | 6.20 | 1.7174 | 29.5 |
| | S4 | ∞ | | | |
| | | | 0.45 | | |
| L2 | S5 | 11.500 | 1.80 | 1.7408 | 27.8 |
| | S6 | −32.530 | | | |
| | | | 2.50 | | |
| A1 | A1 | — | | — | — |
| | | | 0.50 | | |
| L3 | S7 | 13.880 | 3.00 | 1.7292 | 54.7 |
| L4 | S8 | −3.760 | 0.75 | 1.8052 | 25.5 |
| | S9 | −20.520 | | | |
| | | | 4.39 | | |
| L5 | S10 | 41.950 | 2.50 | 1.5891 | 61.3 |
| | S11 | −10.000 | | | |
| | | | 1.50 | | |
| IF | S12 | ∞ | 1.50 | 1.5168 | 64.2 |
| | S13 | ∞ | | | |

Table 2 shows aspheric coefficients of a surface S2 of a first lens L1 having an aspheric shape on an image forming surface side and a surface S11 of a fifth lens L5 on the image forming surface side. Here, assuming that x is a distance from an apex of each aspheric surface in an optical axis direction, a y axis is provided in a direction vertical to the optical axis, R is a paraxial curvature radius, and K, A, B, C or D is an aspheric coefficient, a shape of the aspheric lens can be represented by the following expression. It is to be noted that E in each coefficient represents an exponential notation.

$$x = \frac{(1/R)y^2}{1 + \sqrt{1 - (1+K)(y/R)^2}} + Ay^4 + By^6 + Cy^8 + Dy^{10} \qquad \text{Expression 1}$$

TABLE 2

| SURFACE NUMBERS | ASPHERIC COEFFICIENT | | | | |
|---|---|---|---|---|---|
| | K | A | B | C | D |
| S2 | −7.6000E−01 | −2.4800E−04 | 2.7012E−05 | −8.5921E−07 | 2.2143E−09 |
| S11 | 0.0000E+00 | 2.1620E−03 | −3.3166E−05 | 4.5364E−06 | −7.5193E−08 |

Table 3 shows values of respective parameters of Conditions (1) to (4) in the first embodiment.

TABLE 3

RESPECTIVE PARAMETERS OF FIRST EMBODIMENT

| |f1|/f | 1.285 |
|---|---|
| nd | 1.71736 |
| vd | 29.5 |
| |d/f| | 1.826 |

Figure 3A:
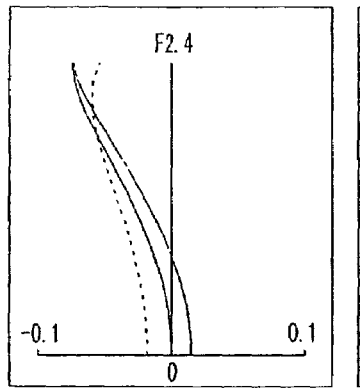
FIG. 3 is a view showing various aberrations of the wide angle lens system according to the first embodiment.
Figure 3B:
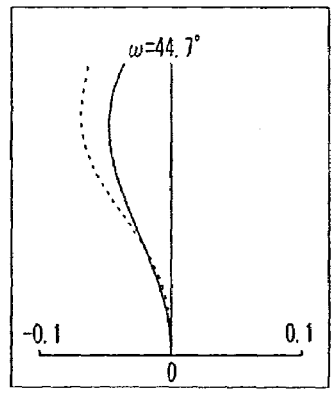
Figure 3C:
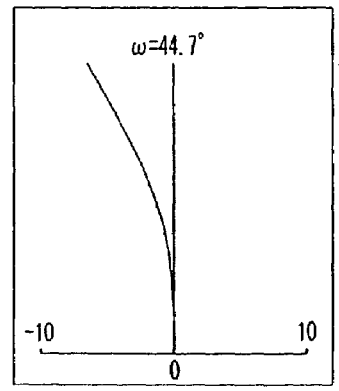

FIG. 3 is a view showing various aberrations in the first embodiment. In FIG. 3A shows a spherical aberration, a solid line indicates a spherical aberration on a d-line, a broken line indicates a spherical aberration on a F-line, and an alternate long and short dash line indicates a spherical aberration on a C-line, respectively. Additionally, 3B shows an image surface curve, a solid line indicates a value on a sagittal image surface, and a broken line indicates a value on a tangential image surface. 3C shows a distortion. It is to be noted that these are likewise applied to later-described FIGS. 5 and 7.

Figure 4:
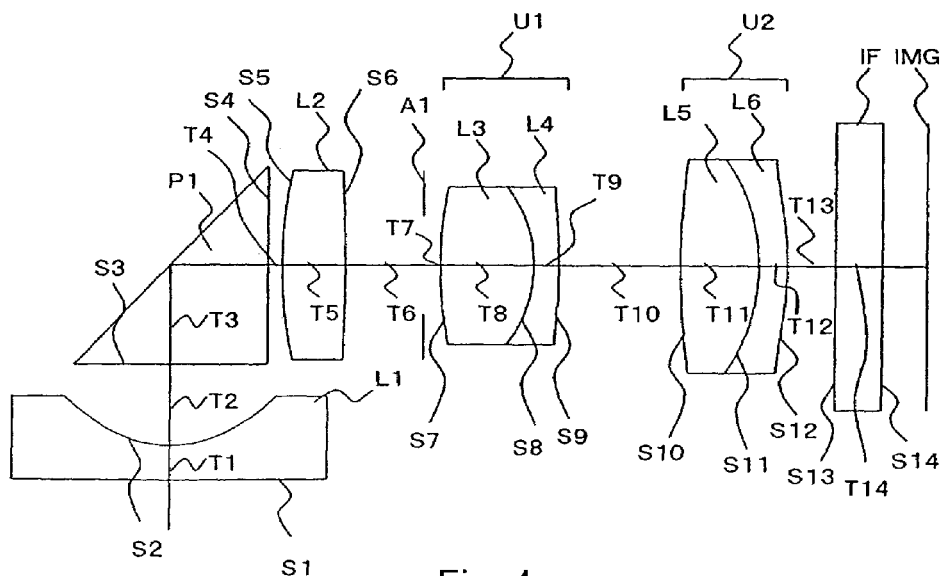
FIG. 4 is a view showing a cross section of a wide angle lens system according to a second embodiment along an optical axis.

A second embodiment will now be described. FIG. 4 is a cross-sectional view showing a wide angle lens system according to a second embodiment on an optical axis. It is to be noted that, in FIG. 4, like reference numerals denote members equal to those in FIG. 2. As shown in FIG. 4, in the wide angle lens system according to the second embodiment, respective optical elements, i.e., a first lens L1, a light path bending member (a triangular prism) P1, a second lens L2, an aperture A1, a first cemented lens U1, a second cemented lens U2 and an optically equivalent member IF are arranged in order from an object side. Here, the second cemented lens U2 is constituted by cementing a fifth lens L5 having a positive refractive power and a sixth lens L6 having a negative refractive power. The second embodiment is different from the first embodiment in that the second cemented lens U2 is arranged in place of the fifth lens L5. Using the second cemented lens U2 as a last lens in this manner can support correction of a magnification chromatic aberration generated in the optical elements arranged on the object side apart from the aperture A1 when further widening the angle.

Table 4 shows respective numeric values in the second embodiment. Further, Table 5 shows aspheric coefficients of surfaces formed into aspheric surfaces in the second embodiment. Furthermore, Table 6 shows values of respective parameters of Conditions (1) to (4) in the second embodiment. It is to be noted that symbols in the respective tables are the same as those in Table 1 to Table 3.

TABLE 4 f = 3.50 Fno = 2.8 ω = 48.2°

| | SURFACE NUMBER | CURVATURE RADIUS R (mm) | INTERVAL (mm) | REFRACTIVE INDEX nd | ABBE NUMBER vd |
|---|---|---|---|---|---|
| L1 | S1 | 300.000 | 1.10 | 1.7680 | 49.2 |
| | S2 | 3.740 | | | |
| | | | 2.60 | | |

TABLE 4-continued f = 3.50 Fno = 2.8 ω = 48.2°

| | SURFACE NUMBER | CURVATURE RADIUS R (mm) | INTERVAL (mm) | REFRACTIVE INDEX nd | ABBE NUMBER vd |
|---|---|---|---|---|---|
| P1 | S3 | ∞ | 6.20 | 1.7521 | 25.1 |
| | S4 | ∞ | | | |
| | | | 0.45 | | |
| L2 | S5 | 14.100 | 2.00 | 1.8467 | 23.8 |
| | S6 | −67.800 | | | |
| | | | 2.50 | | |
| A1 | A1 | — | | — | — |
| | | | 0.55 | | |
| L3 | S7 | 11.810 | 3.00 | 1.7292 | 54.7 |
| L4 | S8 | −4.040 | 0.85 | 1.8052 | 25.5 |
| | S9 | −17.930 | | | |
| | | | 3.90 | | |
| L5 | S10 | 25.390 | 2.50 | 1.6400 | 60.2 |
| L6 | S11 | −6.000 | 0.90 | 1.7308 | 40.5 |
| | S12 | −9.533 | | | |
| | | | 1.50 | | |
| IF | S13 | ∞ | 1.50 | 1.5168 | 64.2 |
| | S14 | ∞ | | | |

TABLE 5

| SURFACE NUMBERS | ASPHERIC COEFFICIENT | | | | |
|---|---|---|---|---|---|
| | K | A | B | C | D |
| S2 | −1.5600E+00 | 1.5140E−03 | −1.7609E−06 | −6.5764E−07 | 3.1315E−08 |
| S12 | 0.0000E+00 | 1.791E−03 | 5.0000E−06 | 1.5000E−06 | −2.5109E−08 |

TABLE 6

RESPECTIVE PARAMETERS OF SECOND EMBODIMENT

| |f1/f| | 1.411 |
|---|---|
| nd | 1.75211 |
| vd | 25.05 |
| |d/f| | 2.038 |

FIGS. 5A, 5B and 5C are views showing various aberrations in the second embodiment. Meanings of FIGS. 5A, 5B and 5C are the same as FIG. 3

Third Embodiment

A third embodiment will now be described. FIG. 6 is a view showing a cross section of a wide angle lens system according to a third embodiment along an optical axis. A lens configuration of the wide angle lens system depicted in FIG. 6 is the same as that of the wide angle lens system shown in FIG. 2, and the explanation of the lens configuration is omitted.

Table 7 shows respective numeric values in the third embodiment. Moreover, Table 8 shows aspheric coefficients of surfaces formed into aspheric surfaces in the third embodiment. Additionally, Table 9 shows values of respective parameters of Conditions (1) to (4) in the third embodiment. It is to be noted that symbols in the respective tables are the same as those in Table 1 to Table 3. It is to be noted Table 7 shows that a last lens L5 is formed of a cycloolefin-polymer-based plastic material based on numeric values of nd and vd.

Figure 7A:
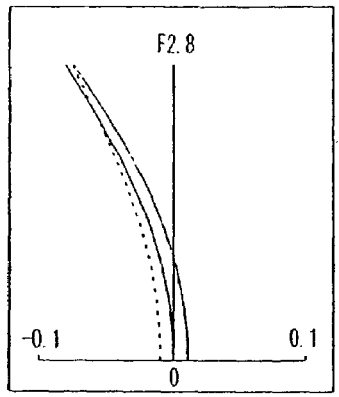
FIG. 7 is a view showing various aberrations of the wide angle lens system according to the third embodiment.
Figure 7B:
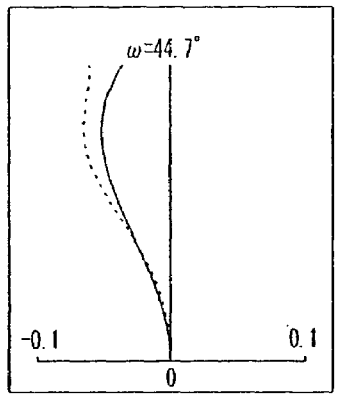
Figure 7C:
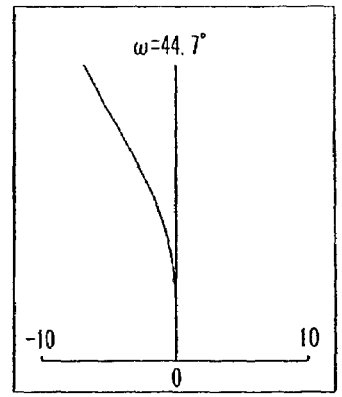

FIGS. 7A, 7B and 7C are views showing various aberrations in the third embodiment. Meanings of FIGS. 7A, 7B and 7C are the same as FIG. 3.

TABLE 7 f = 3.88 Fno = 2.8 ω = 44.7°

| | SURFACE NUMBER | CURVATURE RADIUS R (mm) | INTERVAL (mm) | REFRACTIVE INDEX nd | ABBE NUMBER vd |
|---|---|---|---|---|---|
| L1 | S1 | 500.000 | 0.80 | 1.8061 | 40.7 |
| | S2 | 3.367 | | | |
| | | | 2.00 | | |
| P1 | S3 | ∞ | 6.20 | 1.7174 | 29.5 |
| | S4 | ∞ | | | |
| | | | 0.50 | | |
| L2 | S5 | 9.578 | 2.00 | 1.5850 | 29.3 |
| | S6 | −11.722 | | | |
| | | | 2.40 | | |
| A1 | A1 | — | | — | — |
| | | | 0.50 | | |
| L3 | S7 | 11.940 | 3.00 | 1.7340 | 51.1 |
| L4 | S8 | −3.886 | 0.75 | 1.8467 | 23.8 |
| | S9 | −44.060 | | | |
| | | | 4.85 | | |
| L5 | S10 | 14.840 | 2.50 | 1.5247 | 56.2 |
| | S11 | −10.500 | | | |
| | | | 1.50 | | |
| IF | S12 | ∞ | 1.50 | 1.5168 | 64.2 |
| | S13 | ∞ | | | |

TABLE 8

| SURFACE NUMBERS | ASPHERIC COEFFICIENT | | | | |
|---|---|---|---|---|---|
| | K | A | B | C | D |
| S2 | −1.1596E+00 | 1.2330E−03 | 1.07E−04 | −6.30E−06 | 1.91E−07 |
| S12 | 0.0000E+00 | 3.095E−03 | −9.70E−05 | 8.77E−06 | −1.22E−07 |

TABLE 9

RESPECTIVE PARAMETERS OF THIRD EMBODIMENT

| | |
|---|---|
| \|fl/f\| | 1.084 |
| nd | 1.71736 |
| vd | 29.5 |
| \|d/f\| | 1.872 |

Figure 8:
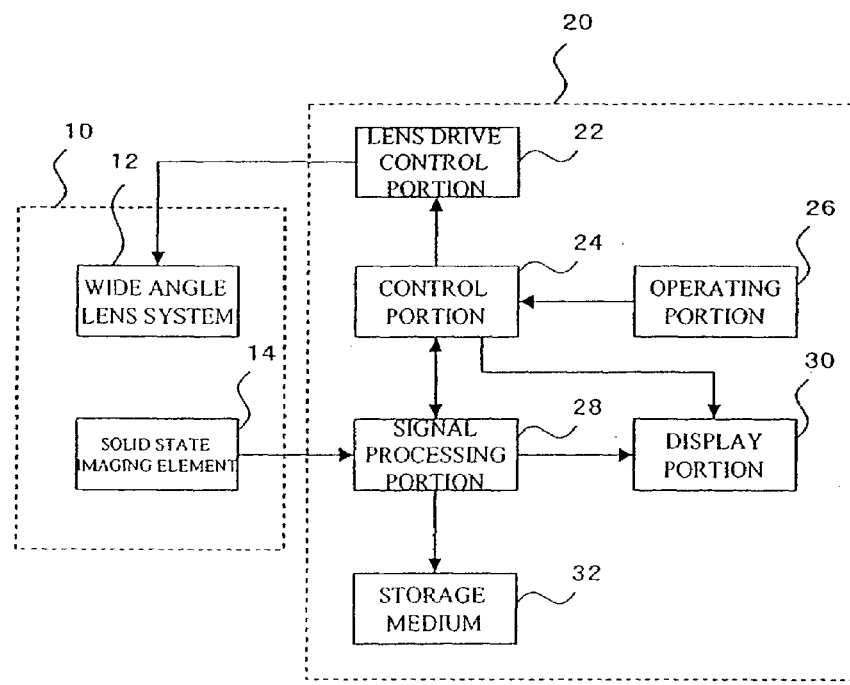
FIG. 8 is a view showing functional blocks of a camera in which a wide angle camera according to this embodiment is mounted.

A description will now be given of a camera including the wide angle lens system according to this embodiment. FIG. 8 is a view showing functional blocks of a digital camera in which the wide angle lens system 12 is mounted. This digital camera is roughly divided into a lens block 10 which acquires an image of an object and a main body portion 20 which performs various kinds of processing of an imaging signal or various kinds of control required for imaging processing. The lens block 10 includes the wide angle lens system 12 and a solid state imaging element 14 which converts an object image led by this wide angle lens system 12 into an electric signal. The solid state imaging element 14 outputs the object image converted into the electric signal to the main body portion 20 as image data.

In the main body portion 20, a control portion 24 executes various kinds of processing based on instructions from a user input through an operating portion 26. Additionally, a signal processing portion 28 executes various kinds of signal processing such as A/D conversion or noise elimination with respect to the image data output from the solid state imaging element 14. Image data subjected to the signal processing is output to a display portion 30 or a recording medium 32.

The recording medium 32 is a data recording medium consisting of a memory card or the like, and image data obtained by the imaging processing is recorded in this recording medium 32. The display portion 30 is a display device such as an LCD, and a user performs confirmation or the like of an image obtained by imaging through this display portion 30. A lens drive control portion 22 outputs a driving signal to a lens movement mechanism mounted in the wide angle lens system when focusing or the like is required, and instructs movement of a lens group. A motor of the lens movement mechanism mounted in the wide angle lens system 12 drives to move the lens group in accordance with this instruction.

As is apparent from the above explanation, in the wide angle lens system according to this embodiment, the respective optical elements arranged on the object side from the aperture A1 are arranged in the order of the first lens L1 having a positive refractive power, the light path bending member P1 and the second lens having a positive refractive power from the object side. Further, at least one surface of the first lens L1 is formed into an aspherical shape. Furthermore, at least one surface of the lenses arranged on the image forming surface side apart from the aperture A1 is formed into an aspherical shape. As a result, according to this embodiment, it is possible to provide, at a low cost, the small and thin wide angle lens system which is a wide angle lens system whose half field angle is 40 degrees to 50 degrees and whose open F number is 2.4 to 2.8.

PARTS LIST 10 lens block
12 wide angle lens
14 imaging element
20 main body portion
22 lens drive control portion
24 control portion
26 operating portion
28 signal processing portion
30 display portion
32 recording medium
A1 aperture
IF equivalent member
IMG image forming surface
L1 first lens
L2 second lens
L3 third lens
L4 fourth lens
L5 fifth lens
L6 sixth lens
P1 bending member
S1-S14 surfaces
T1-T14 intervals
U1 first cemented lens
U2 second cemented lens

What is claimed is:

1. A wide angle lens system, comprising, in order from an object side:
   a first lens having a negative refractive power and at least one aspherical surface;
   a bending member for bending an optical path;
   a second lens having a positive refractive power;
   an aperture which adjusts a light amount;
   a first cemented lens formed by cementing a third lens having a positive refractive power and a fourth lens having a negative refractive power; and
   a fifth lens having a positive refractive power;
   wherein a surface of at least one lens arranged on an image plane side of the aperture is aspherical; and
   wherein the wide angle lens system has a half field angle of approximately 40 degrees to 50 degrees.

2. The wide angle lens system according to claim 1 wherein said aspherical surface of at least one lens arranged on the image plane side of the aperture is arranged in a last lens closest to the image plane and has a shape with which a positive refractive power is gradually weakened or a negative refractive power is gradually intensified from the optical axis toward the periphery.

3. The wide angle lens system according to claim 1 wherein the last lens which constitutes the wide angle lens system and is arranged at a position closest to the image plane is formed of a resin lens.

4. A camera comprising: a wide angle lens system defined in claim 1 and a solid state imaging element arranged on an image forming surface side of the wide angle lens.

* * * * *